(12) United States Patent
Poplett

(10) Patent No.: US 7,564,677 B2
(45) Date of Patent: Jul. 21, 2009

(54) METHOD AND APPARATUS FOR A SPACER FOR AN ELECTRODE LAYER GAP IN A POWER SOURCE

(75) Inventor: James M. Poplett, Plymouth, MN (US)

(73) Assignee: Cardiac Pacemakers, Inc., St. Paul, MN (US)

(*) Notice: Subject to any disclaimer, the term of this patent is extended or adjusted under 35 U.S.C. 154(b) by 782 days.

(21) Appl. No.: 11/112,094

(22) Filed: Apr. 22, 2005

(65) Prior Publication Data
US 2006/0238960 A1  Oct. 26, 2006

(51) Int. Cl.
*H01G 9/04* (2006.01)
*H01G 9/145* (2006.01)
*H01G 4/30* (2006.01)
*H01G 9/00* (2006.01)
*A61N 1/00* (2006.01)

(52) U.S. Cl. .................. 361/508; 29/25.03; 607/5; 361/301.4

(58) Field of Classification Search .......... 361/510, 361/512, 500, 503, 517, 516, 301.4; 29/25.03; 607/5
See application file for complete search history.

(56) References Cited

U.S. PATENT DOCUMENTS

| 3,803,457 A | 4/1974 | Yamamoto |
| 4,659,636 A | 4/1987 | Suzuki et al. |
| 5,154,989 A * | 10/1992 | Howard et al. .......... 429/160 |
| 5,195,019 A | 3/1993 | Hertz |
| 5,660,737 A | 8/1997 | Elias et al. |
| 5,801,917 A | 9/1998 | Elias |

(Continued)

FOREIGN PATENT DOCUMENTS

| GB | 825900 | 12/1959 |
| WO | WO-9854739 A1 | 12/1998 |
| WO | WO-00/19470 | 4/2000 |

OTHER PUBLICATIONS

Morley, A. R., et al., "Electrolytic capacitors: their fabrication and the interpretation of their operations behaviour", *The Radio and Electronic Engineer*, vol. 43, No. 7, (Jul. 1973), 421-429.

(Continued)

*Primary Examiner*—Eric Thomas
*Assistant Examiner*—David M Sinclair
(74) *Attorney, Agent, or Firm*—Schwegman, Lundberg & Woessner, P.A.

(57) ABSTRACT

The present subject matter includes a capacitor that includes at least a first element having at least a first element thickness, and including a first separator disposed between a first electrode and a second electrode, the first electrode having a first connection member with a first proximal portion and a first foldable portion, the first foldable portion folded onto and abutting the first proximal portion, the abutting first proximal portion and first foldable portion having a first thickness approximately equal to the first element thickness and at least a second element having a third electrode with a second connection member, the first element and the second element stacked in a capacitor stack, wherein the first connection member and the second connection member are in alignment defining a connection surface for connection of the first electrode and the third electrode, with the capacitor stack and electrolyte disposed in a case.

15 Claims, 13 Drawing Sheets

U.S. PATENT DOCUMENTS

| | | | |
|---|---|---|---|
| 5,814,082 | A | 9/1998 | Fayram et al. |
| 5,867,363 | A | 2/1999 | Tsai et al. |
| 5,908,151 | A | 6/1999 | Elias |
| 5,930,109 | A | 7/1999 | Fishler |
| 5,963,418 | A | 10/1999 | Greenwood, Jr. et al. |
| 5,983,472 | A | 11/1999 | Fayram et al. |
| 6,004,692 | A | 12/1999 | Muffoletto et al. |
| 6,032,075 | A | 2/2000 | Pignato et al. |
| 6,094,788 | A | 8/2000 | Farahmandi et al. |
| 6,099,600 | A | 8/2000 | Yan et al. |
| 6,118,651 | A | 9/2000 | Mehrotra et al. |
| 6,225,778 | B1 | 5/2001 | Hayama et al. |
| 6,249,423 | B1 | 6/2001 | O'Phelan et al. |
| 6,275,729 | B1 | 8/2001 | O'Phelan et al. |
| 6,321,114 | B1 | 11/2001 | Nutzman et al. |
| 6,388,866 | B1 | 5/2002 | Rorvick et al. |
| 6,402,793 | B1 | 6/2002 | Miltich et al. |
| 6,413,283 | B1 | 7/2002 | Day et al. |
| 6,442,015 | B1 | 8/2002 | Niiori et al. |
| 6,451,073 | B1 | 9/2002 | Farahmandi et al. |
| 6,517,975 | B1 * | 2/2003 | Heller, Jr. ............ 429/231.95 |
| 6,556,863 | B1 | 4/2003 | O'Phelan et al. |
| 6,571,126 | B1 | 5/2003 | O'Phelan et al. |
| 6,660,737 | B2 * | 12/2003 | Almstead et al. ............ 514/247 |
| 6,687,118 | B1 * | 2/2004 | O'Phelan et al. ............ 361/508 |
| 6,699,265 | B1 | 3/2004 | O'Phelan et al. |
| 6,709,946 | B2 | 3/2004 | O'Phelan et al. |
| 6,763,265 | B2 | 7/2004 | O'Phelan et al. |
| 6,833,987 | B1 | 12/2004 | O'Phelan |
| 6,885,887 | B2 | 4/2005 | O'Phelan et al. |
| 2003/0077509 | A1 | 4/2003 | Probst et al. |
| 2003/0195568 | A1 | 10/2003 | O'Phelan et al. |
| 2004/0019268 | A1 | 1/2004 | Schmidt et al. |
| 2004/0114311 | A1 | 6/2004 | O'Phelan et al. |
| 2004/0127952 | A1 | 7/2004 | O'Phelan et al. |
| 2004/0147960 | A1 | 7/2004 | O'Phelan et al. |
| 2004/0147961 | A1 | 7/2004 | O'Phelan et al. |
| 2004/0173835 | A1 | 9/2004 | Schmidt et al. |
| 2004/0174658 | A1 | 9/2004 | O'Phelan et al. |
| 2004/0215281 | A1 | 10/2004 | O'Phelan et al. |
| 2004/0220627 | A1 | 11/2004 | Crespi et al. |
| 2005/0017888 | A1 | 1/2005 | Sherwood et al. |

OTHER PUBLICATIONS

Moynihan, J. D., "*Theory, Design and Application of Electrolytic Capacitors*", Theory, Design and Application of Electrolytic Capacitors, Copyright by John D. Moynihan, (1982), 139 pgs.

Schmidt, Brian L, et al., "Configurations and Methods for Making Capacitor Connections", U.S. Appl. No. 09/706,576, filed Nov. 3, 2000, 26 pgs.

* cited by examiner

US 7,564,677 B2

METHOD AND APPARATUS FOR A SPACER FOR AN ELECTRODE LAYER GAP IN A POWER SOURCE

CROSS REFERENCE TO RELATED APPLICATIONS

The following commonly assigned U.S. Patents are related to the present application and are incorporated herein by reference in their entirety: "High-Energy Capacitors for Implantable Defibrillators," U.S. Pat. No. 6,556,863, filed Oct. 2, 1998, issued Apr. 29, 2003; "Flat Capacitor Having Staked Foils and Edge-Connected Connection Members," U.S. Pat. No. 6,687,118, filed Nov. 3, 2000, issued Feb. 3, 2004; "Flat Capacitor for an Implantable Medical Device," U.S. Pat. No. 6,699,265, filed Nov. 3, 2000, issued Mar. 2, 2004. Additionally, the following commonly assigned Provisional U.S. Patent Application is related to the present application and is incorporated herein by reference in its entirety: "Method and Apparatus for Single High Voltage Aluminum Capacitor Design," Ser. No. 60/588,905, filed on Jul. 16, 2004.

TECHNICAL FIELD

This disclosure relates generally to capacitors, and more particularly, to method and apparatus for a spacer for an electrode layer gap in a power source.

BACKGROUND

As technology progresses, the sizes of electrical interconnections become smaller. Concurrent and related to these size reductions, electronic components are becoming more compact, occupying new, smaller shapes. Electronic components of reduced size, having new shapes, require new methods and structures.

One electronic component having electrical interconnections is the capacitor. To promote size reductions, new shapes, and improved manufacturing, new interconnection methods and structures are needed. These new interconnections should not damage capacitors or their subcomponents, and should form robust connections.

SUMMARY

The above-mentioned problems and others not expressly discussed herein are addressed by the present subject matter and will be understood by reading and studying this specification.

One embodiment of the present subject matter includes an apparatus, comprising: at least a first element having at least a first element thickness, and including a first separator disposed between a first electrode and a second electrode, the first electrode having a first connection member with a first proximal portion and a first foldable portion, the first foldable portion folded onto and abutting the first proximal portion, the abutting first proximal portion and first foldable portion having a first thickness approximately equal to the first element thickness; and at least a second element having a third electrode with a second connection member, the first element and the second element stacked in a capacitor stack, wherein the first connection member and the second connection member are in alignment defining a connection surface for connection of the first electrode and the third electrode, with the capacitor stack and electrolyte disposed in a case.

One additional embodiment of the present subject matter includes an apparatus, comprising: at least a first element having a first element thickness, including at least a first substantially planar electrode with a first connection member, at least a second substantially planar electrode, and a first spacer member; and at least a second element having a third substantially planar electrode with a second connection member, the first element and the second element stacked in alignment and defining a capacitor stack, the capacitor stack disposed in a case containing electrolyte, wherein the first spacer member, the first connection member, and the second connection member are in adjacent alignment defining a connection surface for electrical connection of the first substantially planar electrode and the third substantially planar electrode, with the adjacent first spacer member and first connection member having a first thickness approximately equal to the first element thickness.

Additionally, one embodiment of the present subject matter includes a method for producing a capacitor stack, comprising: stacking a first electrode onto a first element, the first electrode having a first connection member having a first proximal portion and a first foldable portion; folding the first foldable portion onto the first proximal portion; stacking the first element onto a second element having at least one second electrode and a second connection member; aligning the first connection member and the second connection member to define a connection surface for connection of the first electrode and the second electrode; connecting the first electrode and the second electrode at the connection surface; disposing the stacked first element and second element in a case; and filling the case with electrolyte.

One embodiment of the present subject matter includes an apparatus for patient therapy, comprising: a flat capacitor stack having at least a first separator disposed in alignment between a first substantially planar electrode and a second substantially planar electrode, the first substantially planar electrode having a first connection member with a first proximal portion and a first foldable portion, the first foldable portion folded onto and abutting the first proximal portion, the abutting first proximal portion and first foldable portion having a first thickness approximately equal to the first element thickness; and a third substantially planar electrode in stacked alignment with the second substantially planar electrode, the third substantially planar electrode having a second connection member, with the first connection member and the second connection member are in alignment defining a connection surface for connection of the first substantially planar electrode and the third substantially planar electrode; a case having at least one feedthrough, the capacitor stack sealably disposed in the case; programmable electronics connected to the capacitor; and a housing adapted for implantation in the patient, the case and programmable electronics disposed in the housing, wherein the flat capacitor stack and the case are adapted to deliver to the patient from about 5.3 joules per cubic centimeter of capacitor stack volume to about 6.3 joules per cubic centimeter of capacitor stack volume.

Additionally, one embodiment of the present subject matter includes an electrode stack, comprising: a first element having at least a first substantially planar electrode and a second substantially planar electrode in stacked alignment; a second element in stacked alignment with the first element, the second element having at least a third substantially planar electrode and a fourth substantially planar electrode in stacked alignment; a first connection means for interconnecting the first substantially planar electrode and the third substantially planar electrode; and a second connection means for interconnecting the second substantially planar electrode and the forth substantially planar electrode, wherein the first substantially planar electrode and the third substantially electrode are interconnected, and the second substantially planar electrode and the fourth substantially planar electrode are interconnected, and the electrode stack is adapted to deliver from about 7.0 Joules/cubic centimeter of electrode stack volume, to about 8.5 Joules/cubic centimeter of electrode stack volume.

This Summary is an overview of some of the teachings of the present application and not intended to be an exclusive or exhaustive treatment of the present subject matter. Further details about the present subject matter are found in the detailed description and appended claims. Other aspects will be apparent to persons skilled in the art upon reading and understanding the following detailed description and viewing the drawings that form a part thereof, each of which are not to be taken in a limiting sense. The scope of the present invention is defined by the appended claims and their legal equivalents.

DETAILED DESCRIPTION

Figure 1A:
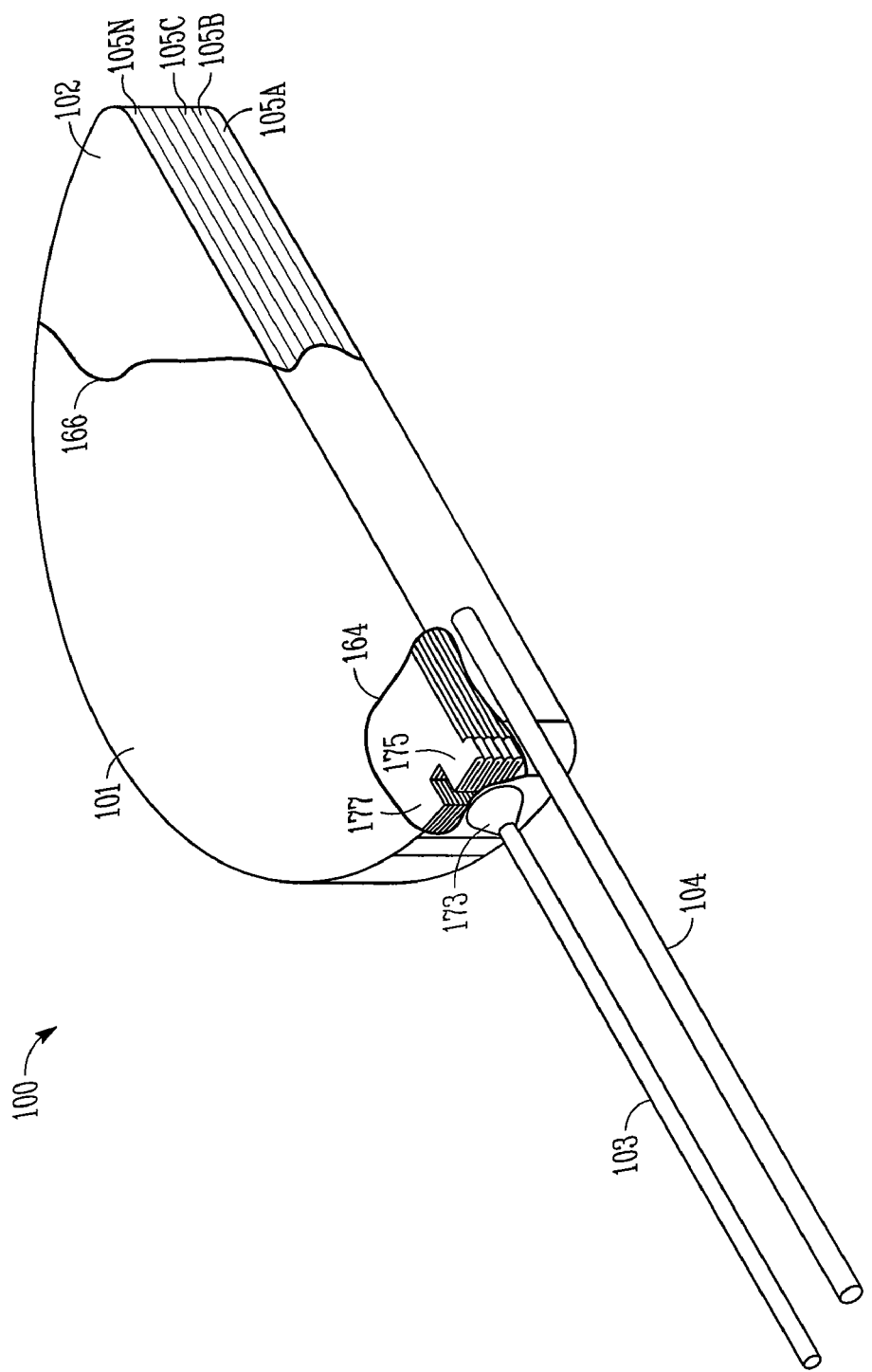
FIG. 1A is an isometric view of a flat capacitor according to one embodiment of the present subject matter.
Figure 1B:
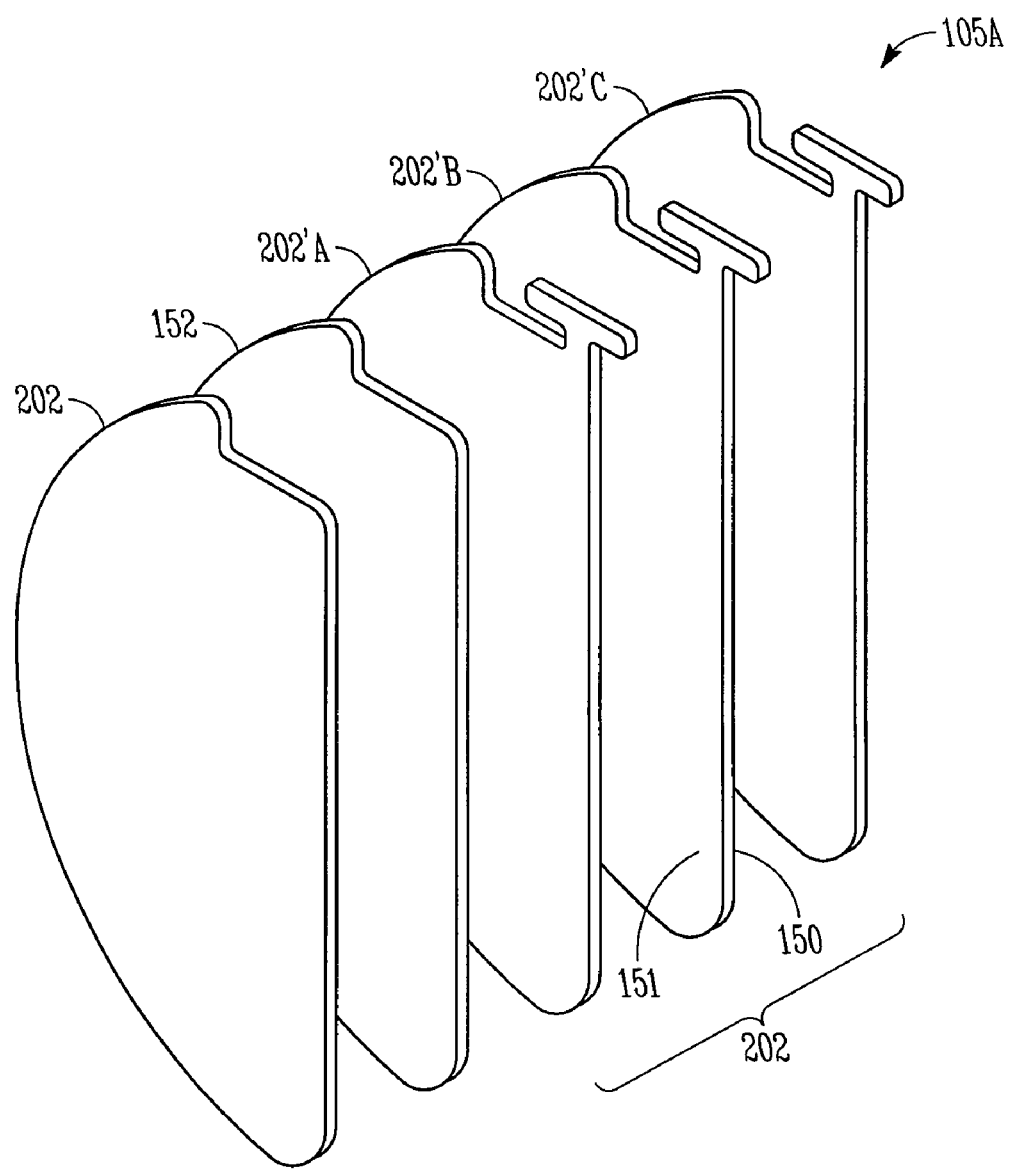
FIG. 1B is an isometric view of capacitor electrodes, according to one embodiment of the present subject matter.

The following detailed description of the present invention refers to subject matter in the accompanying drawings which show, by way of illustration, specific aspects and embodiments in which the present subject matter may be practiced. These embodiments are described in sufficient detail to enable those skilled in the art to practice the present subject matter. References to "an", "one", or "various" embodiments in this disclosure are not necessarily to the same embodiment, and such references may contemplate more than one embodiment. The following detailed description is, therefore, not to be taken in a limiting sense, and the scope is defined only by the appended claims, along with the full scope of legal equivalents to which such claims are entitled.

In various embodiments, flat capacitors with stacked planar or substantially planar electrodes are used to power electronic devices. For example, flat capacitors are used in implantable medical devices such as implantable cardioverter defibrillators. Capacitors include anodes and cathodes, and in various embodiments, the anodes and cathodes are divided into interconnected layers. Additionally, in various embodiments, capacitor layers are organized into one or more elements. Various examples of an element include at least one anode layer and at least one cathode layer. A number of elements may be interconnected to form a capacitor stack. Elements are used during capacitor construction to customize capacitor parameters, such as size, shape, power, and voltage, in various embodiments. For example, elements of a standard size, having a standard thickness, can be used to create multiple capacitors of varying thicknesses. Using a standard element for various capacitor configurations simplifies manufacturing.

In various embodiments, the present subject matter includes anodes, cathodes, and separators which are stacked in alignment. Some embodiments include layers with connection members used for interconnecting to other layers. In various embodiments, a connection member extends away from the main body of the capacitor stack, enabling interconnection among capacitor layers. For example, a number of anode connection members extend away from a capacitor stack for interconnection of multiple capacitor anodes. Connection members are additionally used for cathodes.

In some examples, several stacked elements including anode connection members may have voids between anode connections members, the voids defined by the absence of cathode layers and separator layers. To interconnect the anode layers, these anode connection members are pressed together, in various embodiments. In some embodiments, the edges of all the anode layers abut and form a surface for connection. Such a connection surface is adapted for a laser weld drawn across the surface, for example. However, the pressing step can break the anode layers. As such, these examples would benefit from structures and methods which facilitate the formation of a connection surface without breaking the anodes.

The present subject matter includes spacer embodiments and connection member embodiments which address these needs. For example, in embodiments where a series of anode connection members have voids between them defined by the absence of cathodes and separators, spacers can fill the voids. Additionally, special anode connection members can fill the voids. These and other embodiments are within the scope of the present subject matter.

FIG. 1A shows a flat capacitor 100 constructed according to one embodiment of the present subject matter. Although capacitor 100 is a D-shaped capacitor, in various embodiments, the capacitor is another desirable shape, including, but not limited to, rectangular, circular, oval or other symmetrical or asymmetrical shapes. Capacitor 100 includes a case 101 which contains a capacitor stack 102. In one embodiment, case 101 is manufactured from a conductive material, such as aluminum. In various embodiments, the case is manufactured using a nonconductive material, such as a ceramic or a plastic.

Capacitor 100 includes a first terminal 103 and a second terminal 104 for connecting capacitor stack 102 to an outside electrical component, such as heart monitor circuitry, including defibrillator, cardioverter, and pacemaker circuitry. In one embodiment, terminal 103 is a feedthrough terminal insulated from case 101, while terminal 104 is directly connected to case 101. Terminal 103 comprises an aperture in case 101, in various embodiments. Additionally, terminal 103 comprises a seal 173 in various embodiments. One embodiment of seal 173 includes epoxy. The capacitor incorporates additional connection structures and methods in additional embodiments. The present subject matter includes, but is not limited to, additional embodiments disclosed on pages 12-13, 59-60, 63-82 of related and commonly assigned Provisional U.S. Patent Application: "Method and Apparatus for Single High Voltage Aluminum Capacitor Design," Ser. No. 60/588,905, filed on Jul. 16, 2004, incorporated herein by reference.

Capacitor stack 102 includes one or more cathodes, one or more separators, and one or more anodes. These components are illustrated through break line 164 for explanation. Additionally illustrated are anode connection members 175 and cathode connection member 177. In various embodiments, the connection members are in alignment such that multiple anode subcomponents are in position for interconnection, and multiple cathode subcomponents are position for interconnection.

Additionally, in some embodiments, capacitor subcomponents are organized into capacitor elements 105A, 105B, 105C, . . . , 105N, illustrated through break line 166. In various embodiments, stack 102 is formed in two steps, including a first step of stacking capacitor components into two or more elements 105A, 105B, 105C, . . . , 105N, and a second step of stacking elements into a capacitor stack. Additional embodiments include forming a capacitor stack in a single step, or three or more steps.

In various embodiments, each cathode is a metallic planar structure. Varying examples include a cathode layer connected to additional cathode layers using a variety of methods and structures, including welding and additional connection methods discussed herein. In some embodiments, the cathodes are coupled to conductive case 101, and terminal 104 is attached to case 101, providing a connection between the cathode and outside circuitry. In some embodiments, the cathode is coupled to a feedthrough conductor extending through a feedthrough hole.

In various embodiments, a separator is positioned, for example, to insulate each anode from additional components such as a cathode. The separator includes one or more sheets of kraft paper impregnated with an electrolyte, in various embodiments.

In various embodiments, capacitor stack 102 includes one or more anodes. In embodiments comprised of elements, one or more of the anodes of capacitor stack 102 are configured into an element. In various embodiments, these anode subcomponents are foil shaped. In various embodiments, anodes can include aluminum, tantalum, hafnium, niobium, titanium, zirconium, and combinations of these metals. In one embodiment, at least portions of a major surface of each anode is roughened and/or etched to increase its effective surface area. This increases the capacitive effect of the anode on a volumetric basis, in various embodiments. Various embodiments incorporate other compositions.

In various embodiments, each anode is connected to other anodes of the capacitor, the connected anodes coupled to feedthrough assembly 103 for electrically connecting the anode to circuitry outside the case. In some embodiments, the anodes are connected to the case and the cathodes are coupled to a feedthrough assembly. In various embodiments, both the anode and the cathode are connected to components through feedthroughs.

FIG. 11B shows details of one example of capacitor element 105A, which is representative of capacitor elements 105B-105N. Element 105A includes a cathode 302, a separator 152, and an anode stack 202. In various embodiments, other numbers and arrangements of anodes, cathodes, and separators are utilized. Various embodiment of the present subject matter include, but are not limited to, configurations disclosed on pages 41-50 of related and commonly assigned copending Provisional U.S. Patent Publication: "Method and Apparatus for Single High Voltage Aluminum Capacitor Design," Ser. No. 60/588,905, filed on Jul. 16, 2004, incorporated herein by reference.

In various embodiments, cathode 302 is a planar structure attached to other cathodes of capacitor stack 102 and to terminal 104. In some embodiments, cathode 302 can include aluminum, tantalum, hafnium, niobium, titanium, zirconium, and combinations of these metals. Additionally, some embodiments include a cathode which has a coating. In some of these embodiments, the cathode 302 comprises a titanium coated aluminum substrate.

Some embodiments having a titanium coated cathode material have a higher capacitance per unit area than traditional aluminum electrolytic capacitor cathodes. Traditional cathodes which are 98% aluminum purity or higher generally have capacitance per unit area of approximately 250 uF/cm$^2$ for 30 micron thick cathode, with an oxide breakdown voltage in the 1-3 volt range. However, a cathode as described above results in a capacitance per unit area which, in some embodiments, is as high as 1000 uF/cm$^2$ or more.

Advantageously, this provides a single cathode which services an anode without exceeding the oxide breakdown voltage. When using a traditional cathode to service several layers (2 or more) of anode, the cathode voltage may rise as high as 5 or more volts, which is usually greater than the breakdown voltage. When this occurs, the aluminum cathode begins to form oxide by a hydration process which extracts oxygen from the water present in the electrolyte. The reaction produces hydrogen as a byproduct which in turn has the effect of creating an internal pressure within the capacitor, in various embodiments. Embodiments having internal pressure can demonstrate an undesirable mechanical bulge in the layers of the capacitor stack, or in the case. As such, the titanium-coated cathode described above serves as a corrective mechanism for hydrogen generation.

Separator 152 is located between each anode and cathode, in various embodiments. In various embodiments, separator 152 consists of sheets of kraft paper. Various embodiments include separator impregnated with electrolyte. In some embodiments, separator 152 includes a single sheet or three or more sheets. In various embodiments, the electrolyte can be any electrolyte for an electrolytic capacitor, such as an ethylene-glycol base combined with polyphosphates, ammonium pentaborate, and/or an adipic acid solute.

In one embodiment, each anode stack 202 is a multi-anode stack including three anode foils 202'A, 202'B, and 202'C. In various embodiments, anode stack 202 includes one, two, three or more anode foils having a variety of anode shapes. Each anode foil has a major surface 151 and an edge face 150 generally perpendicular to major surface 151. Anodes 202'A, 202'B, and 202'C can include aluminum, tantalum, hafnium, niobium, titanium, zirconium, and combinations of these metals, in various embodiments.

In one embodiment, anodes 202'A-202'C are high formation voltage anodes. In various embodiments, the anodes are medium and/or low formation variations. In one embodiment, the major surface of each anode 202'A-202'C is roughened or etched to increase its microscopic surface area. This increases the surface area of the foil with no increase in volume. Various embodiments use tunnel-etched, core-etched, and/or perforated-core-etched structures. Various embodiments utilize other foil compositions and classes of compositions.

Depending on which process is used to construct the anode, various surfaces are coated with a dielectric. For example, in embodiments where the anode shapes are punched from a larger sheet, which has previously been coated with dielectric, only the surfaces which have not been sheared in the punching process are coated with dielectric. But if the dielectric is formed after punching, in various embodiments, all surfaces are coated. In some embodiments, anodes are punched from a larger sheet to minimize handling defects due to handling during the manufacturing process. For example, if a larger sheet is used as a starting material from which a number of anode layers are punched, machines or operators can grasp areas of the starting material which is not intended to form the final anode. Generally, in embodiments where the entire anode is not covered with dielectric, the anode is aged to restore the dielectric.

Various embodiments include a capacitor stack adapted to deliver between 7.0 Joules/cubic centimeter and 8.5 Joules/cubic centimeter. Some embodiments are adapted to deliver about 7.7 Joules/cubic centimeter. In some embodiments, the anode has a capacitance of between approximately 0.70 and 0.85 microfarads per square centimeter when charged at approximately 550 volts. In various embodiments, these ranges are available at a voltage of between about 410 volts to about 610 volts.

In various embodiments, the stack is disposed in a case, and linked with other components, a state which affects some of these values. For example, in one packaged embodiment, including a case and terminals, the energy density available ranges from about 5.3 joules per cubic centimeter of capacitor stack volume to about 6.3 joules per cubic centimeter of capacitor stack volume. Some embodiments are adapted to deliver about 5.8 joules. In various embodiments, these ranges are available at a voltage of between about 410 volts to about 610 volts.

In various embodiments, a first capacitor stack configuration includes nine cathodes, twenty separators, and twenty-eight anodes. A single separator may include one, two, or more sheets of a separator material, such as kraft paper. One way to form such a combination would be to stack eight elements including three anode layers and one element including two anode layers. The number of layers, and the number of elements, is selectable by a capacitor stack design and manufacturing process to achieve a desired capacitor power and thickness, in various embodiments.

In various embodiments, a second capacitor stack configuration includes nineteen cathodes, forty separators, and fifty-eight anodes. One way to form such a combination would be to stack eighteen first elements, with each first element including three anode layers, one cathode layer, and two separators, with a second element having two anode layers, one cathode layer, and with a third element having two separators, and two anode layers. The number of layers, and the number of elements, is selectable by a capacitor stack design and manufacturing process to achieve a desired capacitor power and thickness, in various embodiments. The configuration offered as an example should not be construed as limiting, as other configurations are possible depending on packaging and power needs of various applications.

Figure 2A:
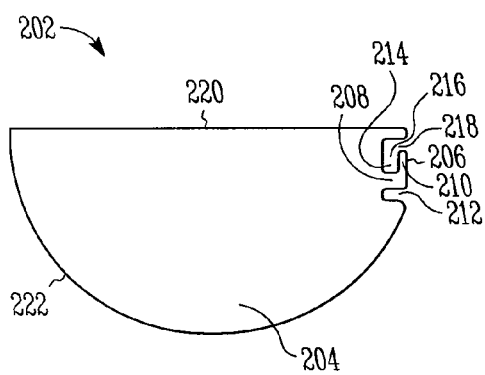
FIG. 2A is a top view of an anode for use in constructing a capacitor according to one embodiment of the present subject matter.

FIG. 2A shows an anode 202 according to one embodiment of the present subject matter. Anode 202 is shown before it is assembled into capacitor stack. Anode 202 includes a main body portion 204 having one or more connection members 206. In one embodiment, connection member 206 includes one or more separate members attached to the anode by welding, staking, or by using another connection method and/or structure. In various embodiments, connection member 206 is a protrusion from the main body portion 204. Various embodiments define connection member 206 with an excise operation. Various excise operations include punching and laser-cutting. The present subject matter can include additional excise operations. The present subject matter can include shaping operations additionally, such as forging.

In various embodiments, portions of connection member 206 are not etched. Etching can cause an anode to become brittle, and unetched portions can decrease failure from flexing and other types of stresses induced in processing and use. Unetched portions are defined in a number of ways. For instance, in one embodiment, a resin mask is put on portions of connection member 206 to keep those masked portions from becoming etched during the etching process. This provides for unetched, non-porous sections which improve the weldability of anode edges with respect to each other. Various embodiments include, but are not limited to, the teachings disclosed on pages 32-34 of related and commonly assigned Provisional U.S. Patent Application "Method and Apparatus for Single High Voltage Aluminum Capacitor Design," Ser. No. 60/588,905, filed on Jul. 16, 2004, incorporated herein by reference.

Connection member 206 includes a proximal section 208 and distal section 210. In the embodiment of FIG. 2A, connection member 206 is an L-shaped member. However, it can have other shapes. In one embodiment, a portion of a distal section 210 is unetched.

In one embodiment, proximal section 208 is connected to main body 204 and is defined in part by a pair of cut-out portions 212 and 214 located on opposing sides of proximal section 208. Distal section 210 is connected to a portion of proximal section 208, in various embodiments. In some embodiments, it is integral with proximal section 208. Distal section 210 is attached as a separate member, in some embodiments. In one embodiment, distal section 210 is defined in part by a cut-out portion 216 which is located between main body 204 and distal section 210, and a cut-out portion 218 which separates distal section 210 from main body 204. In this embodiment, connection member 206 is located within the general shape or outline of anode 202. In various embodiments, connection member 206 extends further from the main body of anode 202 or connection member 206 is more internal within the main body of anode 202.

In some embodiments, each anode in capacitor stack includes a connection member such as connection member 206. In various embodiments, one or more anode foils in a multi-anode stack have a connection member 206 while the other anode foils in the multi-anode stack are connected to the anode having the connection member. For instance, in one embodiment, a three-foil anode stack includes one foil having a connection member 206 and two foils without connection members. The two foils without connection members are welded, staked, or otherwise attached to the foil having the connection member.

Figure 2B:
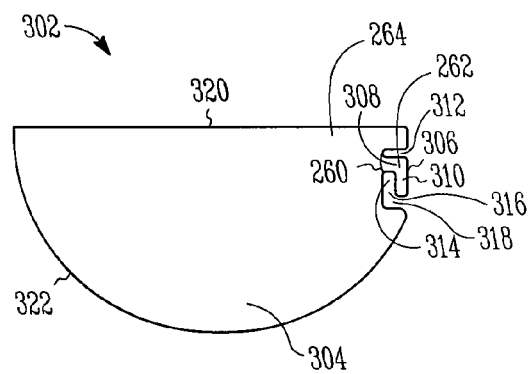
FIG. 2B is a top view of a cathode for use in constructing a capacitor according to one embodiment of the present subject matter.

FIG. 2B shows a cathode 302 according to one embodiment of the present subject matter. Cathode 302 is shown before it is assembled into a capacitor stack. Cathode 302 includes a main body portion 304 having one or more connection members 306. In one embodiment, connection member 306 is an integral portion of cathode 302, and is punched, laser-cut, or otherwise shaped from the cathode. In one embodiment, connection member 306 includes one or more separate members attached to the cathode by welding, staking, or other connection method. The present subject matter includes, but is not limited to, additional embodiments illustrated on pages 13-29 of related and commonly assigned copending Provisional U.S. Patent Application: "Method and Apparatus for Single High Voltage Aluminum Capacitor Design," Ser. No. 60/588,905, filed on Jul. 16, 2004, incorporated herein by reference.

In one embodiment, connection member 306 includes a proximal section 308 and a distal section 310. In the embodiment of FIG. 2B, connection member 306 is an L-shaped member. However, additional embodiments have other shapes. In various embodiments, proximal section 308 is connected to main body 304 and is defined in part by a pair of cut-out portions 312 and 314 located on opposing sides of proximal section 308. Distal section 310 is connected to a portion of proximal section 308. In one embodiment, it is integral with proximal section 308. In some embodiments, distal section 310 is attached as a separate member. In one embodiment, distal section 310 is defined in part by a cut-out portion 316 which is located between main body 304 and distal section 310, and a cut-out portion 318 which separates distal section 310 from main body 304. In this embodiment, connection member 306 is located within the general shape or outline of cathode 302. In various embodiments, connection member 306 extends further from the main body of cathode 302 or connection member 306 is more internal within the main body of cathode 302.

For instance, in various embodiments, connection members 206 and 306 may be in different positions along the edges or even within the main body portions of the capacitor foils 202 and 302. For instance, in some embodiments connection members 206 and 306 are located along edges 220 and 320 of the respective electrodes 202 and 302. In some embodiments, the portions are located along curved edges 222 and 322 of the respective electrodes 202 and 302. In various embodiments, the portions may be cut-out within main bodies 204 and 304. In one embodiment, proximal section 308 of cathode 302 and proximal section 208 of anode 202 are located in different positions (relative to each other) on their respective electrodes, while distal sections 210 and 310 overlap.

Figure 3A:
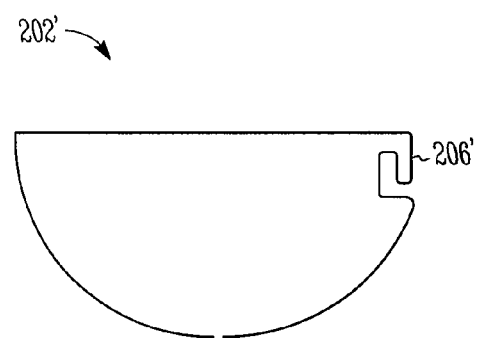
FIG. 3A is a top view of an anode for use in constructing a capacitor according to one embodiment of the present subject matter.
Figure 3B:
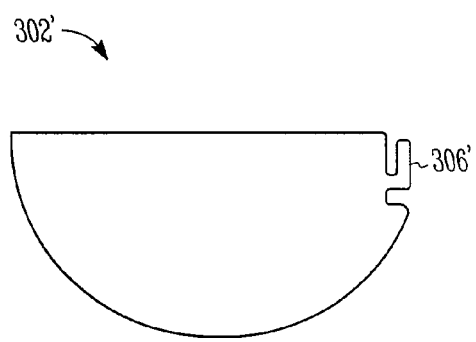
FIG. 3B is a top view of a cathode for use in constructing a capacitor according to one embodiment of the present subject matter.

FIGS. 3A and 3B show an anode 202' and a cathode 302' according to one embodiment of the present subject matter. Anode 202' and cathode 302' are shown before being assembled into capacitor stack. In various embodiments, anode connection member 206' does not include a cut-out such as cut-out 212 of anode 202. Additionally, in various embodiments, connection member 306' does not include a cut-out such as cut-out 318 of cathode 302.

Figure 4A:
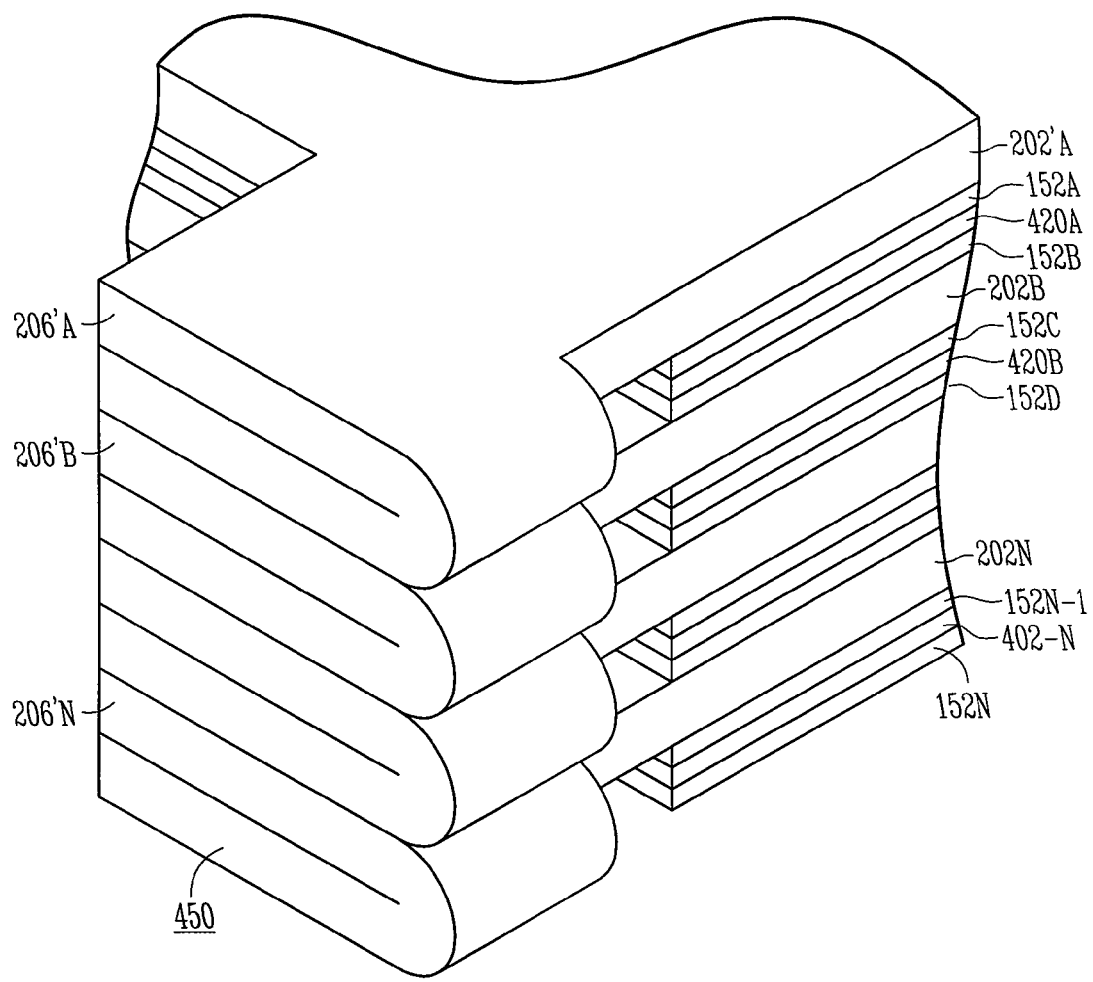
FIG. 4A is a partial perspective view of a capacitor stack, according to one embodiment of the present subject matter.

FIG. 4A is a partial perspective view of a capacitor stack, according to one embodiment of the present subject matter. In various embodiments, the capacitor stack includes cathodes 420A, 420B, . . . , 420N, separators 152A, 152B, . . . , 152(N-1), 152N, and anodes 202'A, 202'B, . . . , 202'N.

The anodes 202'A, 202'B, . . . , 202'N include a folded connection member 206'A, 206'B, . . . , 206'N. In some embodiments, the folded connection member is not etched. Various embodiments include, but are not limited to, the teachings disclosed on pages 115-119 of related and commonly assigned Provisional U.S. Patent Publication: "Method and Apparatus for Single High Voltage Aluminum Capacitor Design," Ser. No. 60/588,905, filed on Jul. 16, 2004, incorporated herein by reference.

In various embodiments, the folded connection members define a connection surface 450. In some embodiments, the connection surface is comprised of edge surfaces of multiple anodes 202'A, 202'B, . . . , 202'N. In additional embodiments, other subcomponents contribute to the shape of the connection surface 450.

In various embodiments, the anode component of the element can include foil subcomponents which do not include a folded connection member. In various embodiments, the anode subcomponents are interconnected through their abutting position in a capacitor element. In additional embodiments, anode foils are interconnected using other forms of connection, such as edge welds or solid-state welds such as stake-welds.

Figure 4B:
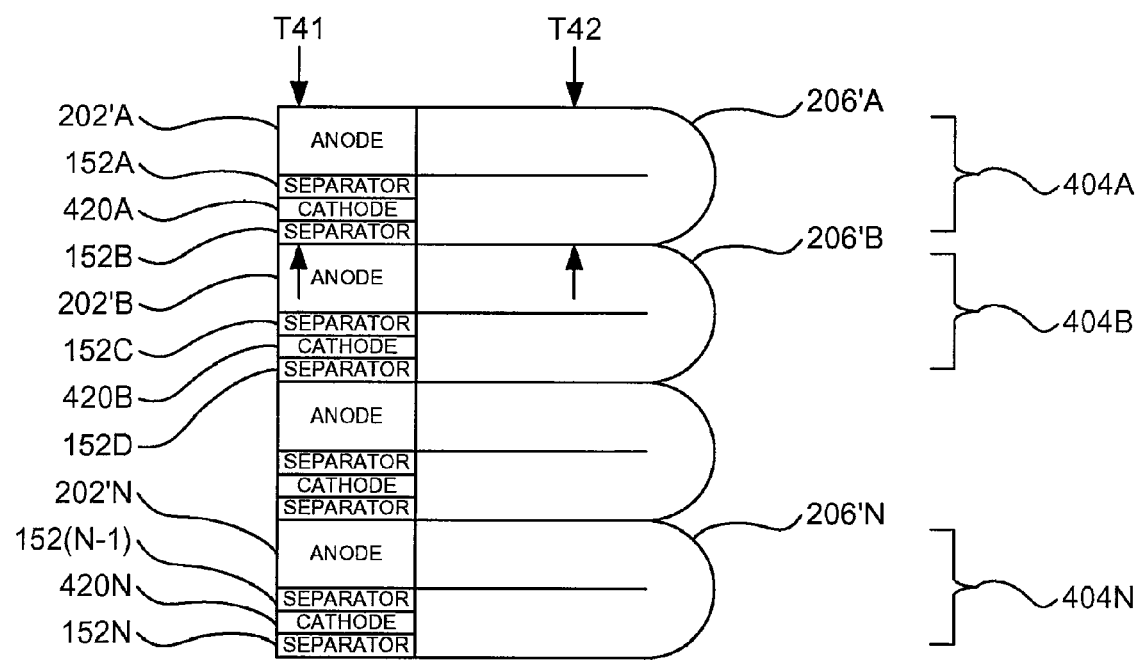
FIG. 4B is a partial front view of the capacitor of FIG. 4A.

FIG. 4B is a partial front view of the capacitor of FIG. 4A. In various embodiments, a capacitor stack is configured into elements 404A, 404B, . . . , 404N. Element 404A has an element thickness T41, in various embodiments. Although the illustrated elements 404A, 404B, . . . , 404N include a single anode 202'A, 202'B, . . . , 202'N which is of a thickness approximately equivalent to the combined thickness of a stack including two separators 152A, 152B, . . . , 152(N-1), 152N and a cathode 420A, 420B, . . . , 420N, other embodiments are within the scope of the present subject matter. For example, the anode 202'A, 202'B, . . . , 202'N can be comprised of several abutting anode foil subcomponents which are not pictured.

In various embodiments, the stackable nature of the elements, and the definition of a connection surface with only anode connection members, is enabled by selecting anodes, cathodes, and separators of a common thickness. For example, in various embodiments, folded connection member has a thickness T42. In various embodiments, thickness T41 is equivalent to thickness T42.

In various embodiments, the cathode of the illustration ranges from about 0.001 inches to about 0.003 inches in thickness. The separator layer, in various embodiments, ranges form about 0.00025 inches to about 0.001 inches in thickness. Also, the anode ranges from about 0.003 inches, to about 0.005 inches in thickness, in varying embodiments. In some embodiments the anode is comprised of multiple abutting anode foils. In some of these embodiments, each anode foil is from about 0.0035 inches to 0.004 inches thick. The combination of three anodes, for example, ranges from 0.0105 inches to about 0.012 inches. Varying capacitor elements can include two or more abutting anode foils as well.

Figure 5A:
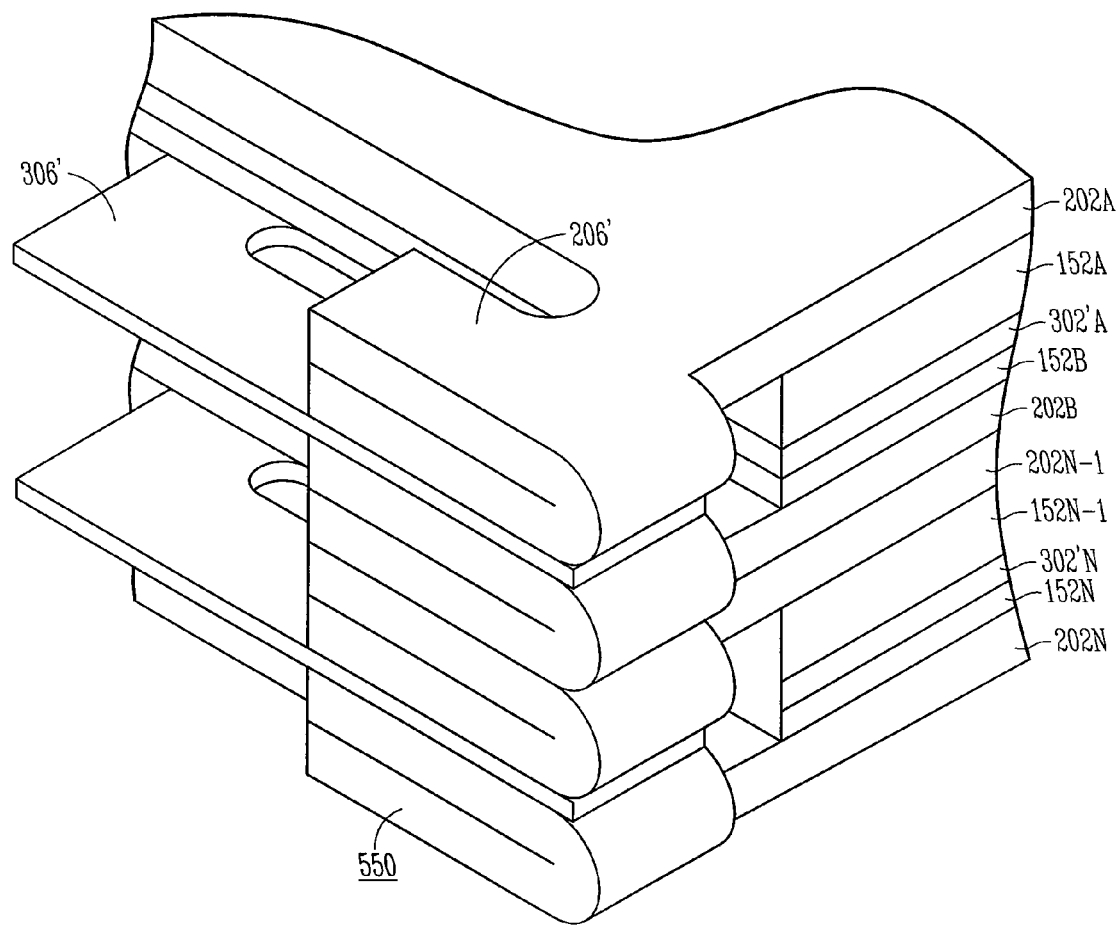
FIG. 5A is a partial perspective view of a capacitor stack, according to one embodiment of the present subject matter.
Figure 5B:
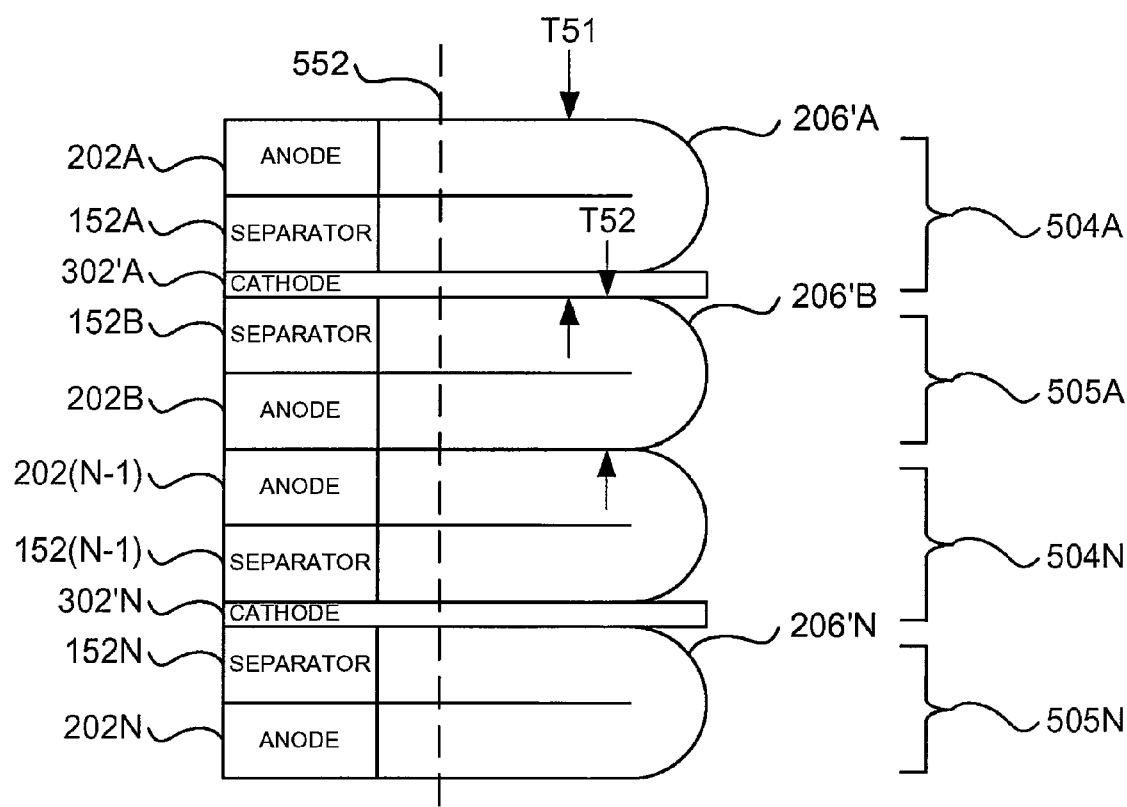
FIG. 5B is a partial front view of the capacitor of FIG. 5A.

FIGS. 5A-5B present partial views of a capacitor stack, according to one embodiment of the present subject matter/is a front view of a capacitor stack. FIG. 5B is a perspective view of the capacitor stack. In various embodiments, the capacitor stack includes cathodes 302'A, . . . , 302'N, separators 152A, 152B, . . . , 152(N-1), 152N, and anodes 202A, 202B, . . . , 202(N-1), 202N. In various embodiment, the anodes 202A, 202B, . . . , 202(N-1), 202N include folded connection members 206'A, 206'B, . . . , 206'N, respectively, which define one connection surface 550.

Additionally shown are first elements 504A, . . . , 504N, and second elements 505A, . . . , 505N. Although the illustrated first element 504A, . . . , 504N include a single anode 202A, 202B, . . . , 202(N-1), 202N which is of a thickness approximately equivalent to a separator 152A, 152B, . . . , 152(N-1), 152N, other embodiments are within the scope of the present subject matter. For example, the anode 202A, 202B, . . . , 202(N-1), 202N can be comprised of several abutting anode foil subcomponents which are not pictured. The anode 202A, 202B, . . . , 202(N-1), 202N can include one foil which includes a folded connection member 206'A, 206'B, . . . , 206'N, in addition to foils which do not include a connection member. In these embodiments, the anode foils are interconnected through their abutting position in a capacitor element. In various embodiments, anode foils are interconnected using other forms of connection, such as edge welds or solid-state welds such as stake-welds.

In various embodiments, the cathode of the illustration ranges from about 0.001 inches to about 0.003 inches in thickness. The separator layer, in various embodiments, ranges form about 0.0025 inches to about 0.002 inches in thickness. Also, the anode ranges from about 0.002 inches, to about 0.005 inches in thickness, in varying embodiments. In various embodiments the anode is comprised of multiple abutting anode foils. For example, in one embodiment, each anode foil is from about 0.003 inches to 0.005 inches thick. Varying capacitor elements can include two or more abutting anode foils.

The cathode 302'A, . . . , 302'N illustrated is useful for filling gaps between anode connection members in the construction of an anode connection surface, in various embodiments. The cathode 302'A, . . . , 302'N as illustrated is cut away, at cut line 552, from the cathode layers of the main capacitor stack during manufacturing processes. Therefore, in various use embodiments, the cathode 302'A, . . . , 302'N is not electrically connected to the cathode of the main capacitor stack. The present subject matter includes, but is not limited to, the teachings disclosed on pages 96-100 of related and commonly assigned Provisional U.S. Patent Publication: "Method and Apparatus for Single High Voltage Aluminum Capacitor Design," Ser. No. 60/588,905, filed on Jul. 16, 2004, incorporated herein by reference.

The examples illustrated in FIGS. 4A-5B are not to be understood as limiting. Various additional embodiments include anode connection surfaces with non-folded anode connection members, and folded cathode connection members. Additional embodiments include cathode connection surfaces having folded anode connection members and/or folded cathode connection members. The configurations provided are embodiments which are useful for explanation, but are not exhaustive or exclusive of examples within the scope of the present subject matter.

Figure 6A:
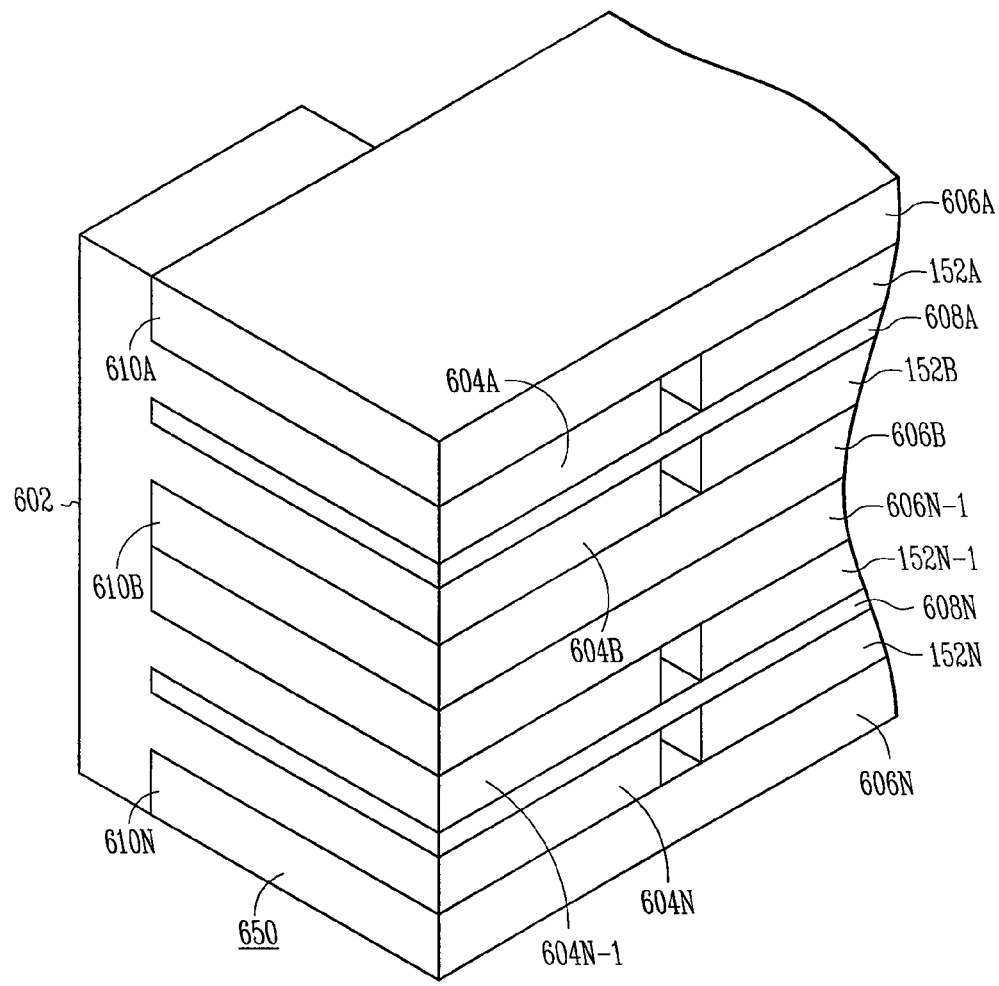
FIG. 6A is a partial perspective view of a capacitor stack, according to one embodiment of the present subject matter.

FIG. 6A is a partial perspective view of a capacitor stack, according to one embodiment of the present subject matter. In various embodiments, the capacitor stack includes cathodes 608A, 608B, . . . , 608N, spacer members 604A, 604B, . . . 604N, and anodes 606A, 606B, . . . . , 606(N-1), 606N. Various embodiments additionally include a connection surface 650. Anode 606A, 606B, . . . , 606(N-1), 606N can be comprised of several abutting anode foils which are not pictured, in various embodiments. Additionally, in various embodiments, separator layers are positioned behind spacer members 604A, 604B, . . . , 604N, and out of view. These layers are pictured in perspective view FIG. 6B. As such, the spacer members 604A, 604B, . . . , 604N are approximately as thick as separator layers.

In some embodiments, spacer members 604A, 604B, . . . , 604N are separate detached components. In additional embodiments, the spacer members 604A, 604B, . . . , 604N are attached to a main spacer body 602. A main spacer body 602, in various embodiments, is adapted for positioning several spacer members 604A, 604B, . . . , 604N at once. A main spacer body 602 and spacer members 604A, 604B, . . . , 604N can be formed from a unitary material structure. For example, the main spacer body 602 and spacer members 604A, 604B, . . . , 604N can be made from plastic. Additional materials are also within the scope of the present subject matter. For example, a main spacer body 602 and spacer members 604A, 604B, . . . , 604N may be machined from aluminum. Further embodiments may be extruded from aluminum.

Additionally shown are first elements 605A, . . . , 605N, and second elements 607A, . . . , 607N. Although the illustrated first element 605A, . . . , 605N include a single anode 606A, 606B, . . . , 606(N-1), 606N which is of a thickness approximately equivalent to a separator 152A, 152B, . . . , 152(N-1), 152N, other embodiments are within the scope of the present subject matter. For example, the anode 606A, 606B, . . . , 606(N-1), 606N can be comprised of several abutting anode foil subcomponents which are not pictured. The anode 606A, 606B, . . . , 606(N-1), 606N can include one foil which includes a folded connection member 610A, 610B, . . . , 610N, in addition to foils which do not include a connection member. In these embodiments, the anode foils are interconnected through their abutting position in a capacitor element. In various embodiments, anode foils are interconnected using other forms of connection, such as edge welds or solid-state welds such as stake-welds.

In various embodiments, the cathode of the illustration ranges from about 0.001 inches to about 0.003 inches. The spacer members 604A, 604B, . . . , 604N layer, in various embodiments, range form about 0.001 inches to about 0.005 inches. Also, the anode ranges from about 0.002 inches, to about 0.005 inches, in various embodiments. In some embodiments the anode is comprised of multiple abutting anode foils. For example, in one embodiment, each anode foil is from about 0.0035 inches to 0.004 inches. Varying capacitor elements can include two or more abutting anode foils.

Figure 6B:
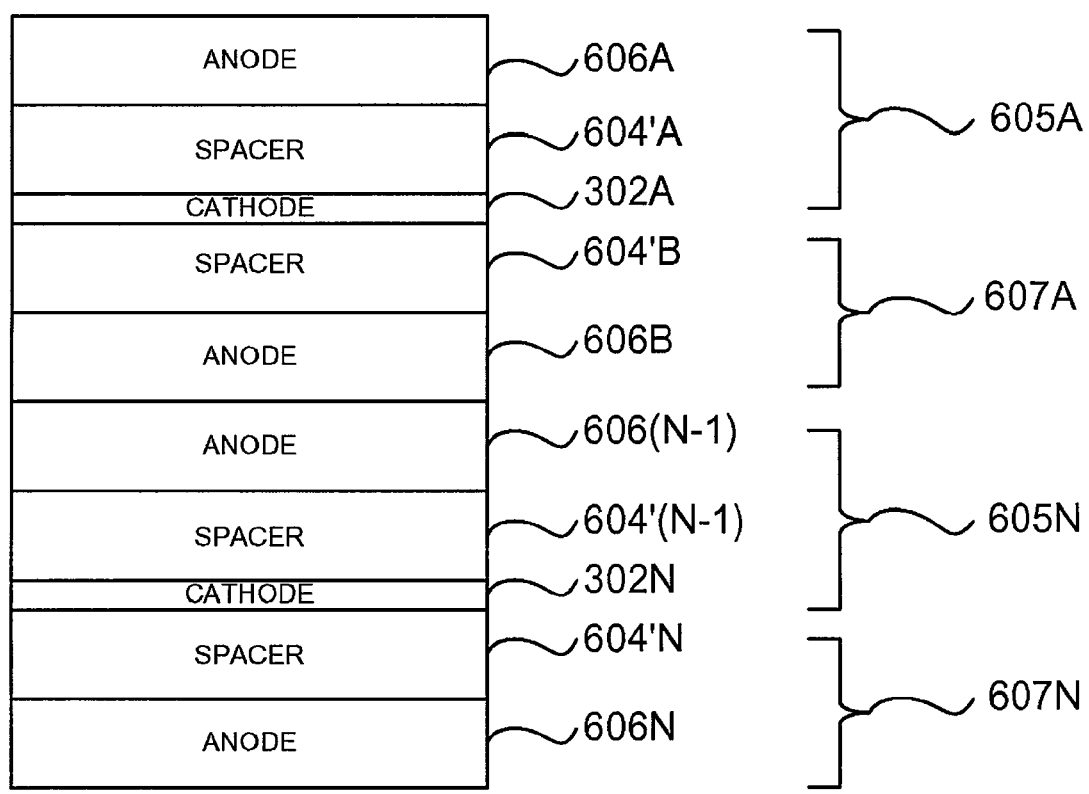
FIG. 6B is a partial front view of the capacitor of FIG. 6A.

FIG. 6B is a partial front view of a capacitor stack with spacers, according to one embodiment of the present subject matter. In various embodiments, the illustration includes spacer members 604'A, 604'B, . . . , 604'N, which are not interconnected. Additionally, illustrated are first elements 605A, . . . , 605N, and second elements 607A, . . . , 607N. Although the illustrated first elements 605A, . . . 605N include a single anode 606A, 606B, . . . , 606(N-1), 606N respectively, which is of a thickness approximately equivalent to a separator 152A, 152B, . . . , 152(N-1), 152N (not pictured), other embodiments are within the scope of the present subject matter.

In various examples, the anodes 606A, 606B, . . . , 606(N-1), 606N can be comprised of several abutting anode foil subcomponents. The anodes 606A, 606B, . . . , 606(N-1), 606N can include one foil which includes a connection member, in addition to foils which do not include a connection member. In various embodiments, the anode foils are interconnected through their abutting position in a capacitor element. In additional embodiments, anode foils are interconnected using other forms of connection, such as edge welds or solid-state welds such as stake-welds.

In some embodiments, the connection member is not etched, while the remaining anode is. Various embodiments include, but are not limited to, the teachings disclosed on pages 115-119 of related and commonly assigned Provisional U.S. Patent Publication: "Method and Apparatus for Single High Voltage Aluminum Capacitor Design," Ser. No. 60/588, 905, filed on Jul. 16, 2004, incorporated herein by reference.

Figure 7A:
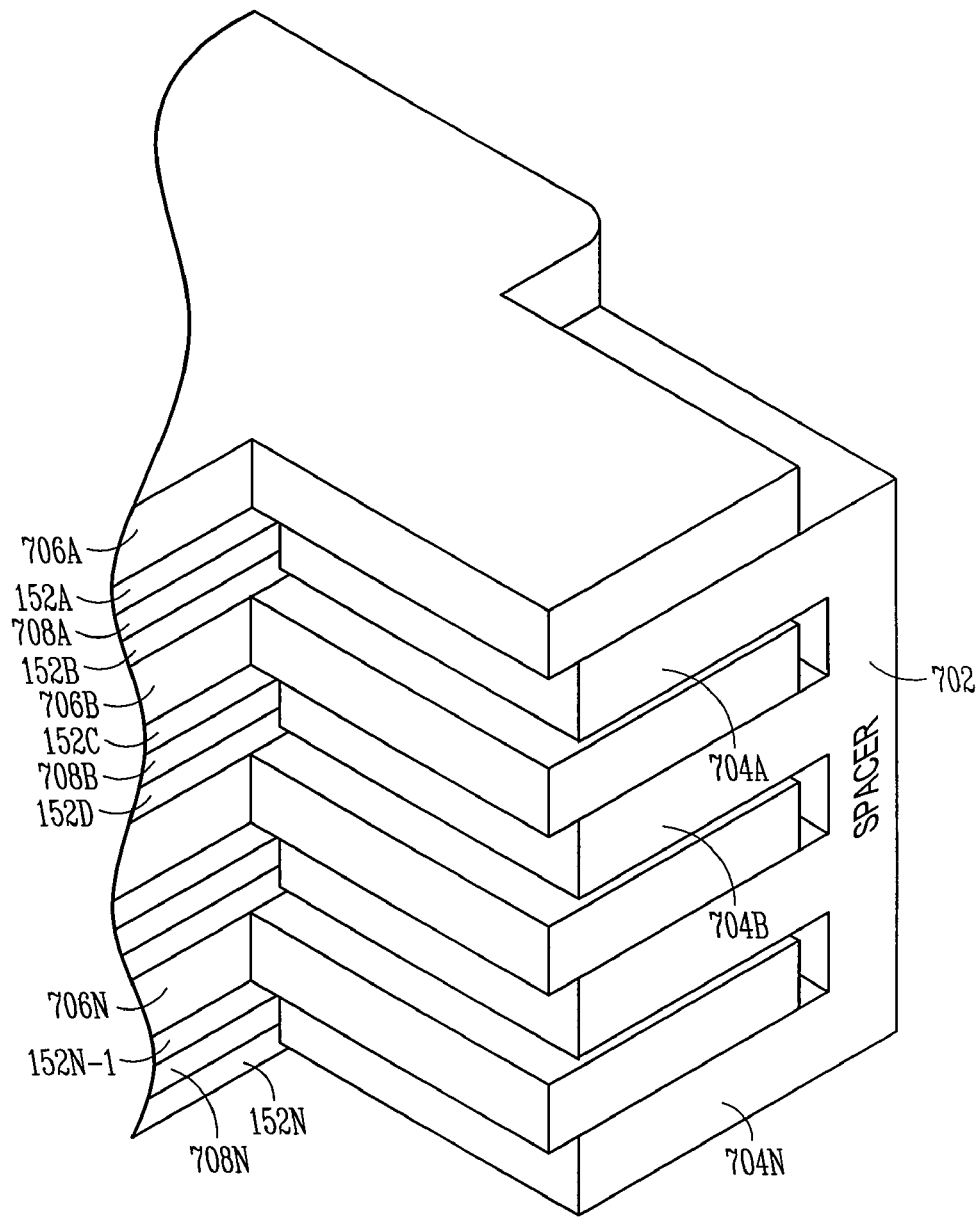
FIG. 7A is a partial perspective view of a capacitor stack, according to one embodiment of the present subject matter.

FIG. 7A is a partial perspective view of a capacitor stack, according to one embodiment of the present subject matter. In various embodiments, the capacitor stack includes cathodes 708A, 708B, . . . , 708N, separators 152A, 152B, . . . , 152(N-1), 152N, spacer members 704A, 704B, . . . , 704N, and anodes 706A, 706B, . . . , 706N. Anodes 706A, 706B, . . . , 706N can be comprised of several abutting anode foils which are not pictured, in various embodiments. The illustrated spacer members 704A, 704B, . . . , 704N are approximately equivalent in thickness to the combined thickness of a stack including two separators 152A, 152B, ..., 152(N–1), 152N and a cathode 708A, 708B, ..., 708N, in various embodiments.

In some embodiments, spacer members 704A, 704B, ..., 704N are separate detached components. In additional embodiments, including the embodiments pictured, the spacer members 704A, 704B, ..., 704N are attached to a main spacer body 702. A main spacer body 702, in various embodiments, is adapted for positioning several spacer members 704A, 704B, ..., 704N at once. A main spacer body 702 and spacer members 704A, 704B, ..., 704N can be formed from a unitary material structure. For example, the main spacer body 702 and spacer members 704A, 704B, ..., 704N can be made from plastic. Additional materials are also within the scope of the present subject matter. For example, a main spacer body 702 and spacer members 704A, 704B, ..., 704N may be machined from aluminum.

In various embodiments, the cathode of the illustration ranges from about 0.001 inches to about 0.003 inches. The separator layer, in various embodiments, ranges form about 0.001 inches to about 0.005 inches. The spacer members 704A, 704B, ..., 704N layer, in various embodiments, range form about 0.002 inches to about 0.005 inches. Also, the anode ranges from about 0.003 inches, to about 0.005 inches, in varying embodiments. In some embodiments the anode is comprised of multiple abutting anode foils. For example, in one embodiment, each anode foil is from about 0.003 inches to 0.005 inches. Varying capacitor elements can include two or more abutting anode foils.

Figure 7B:
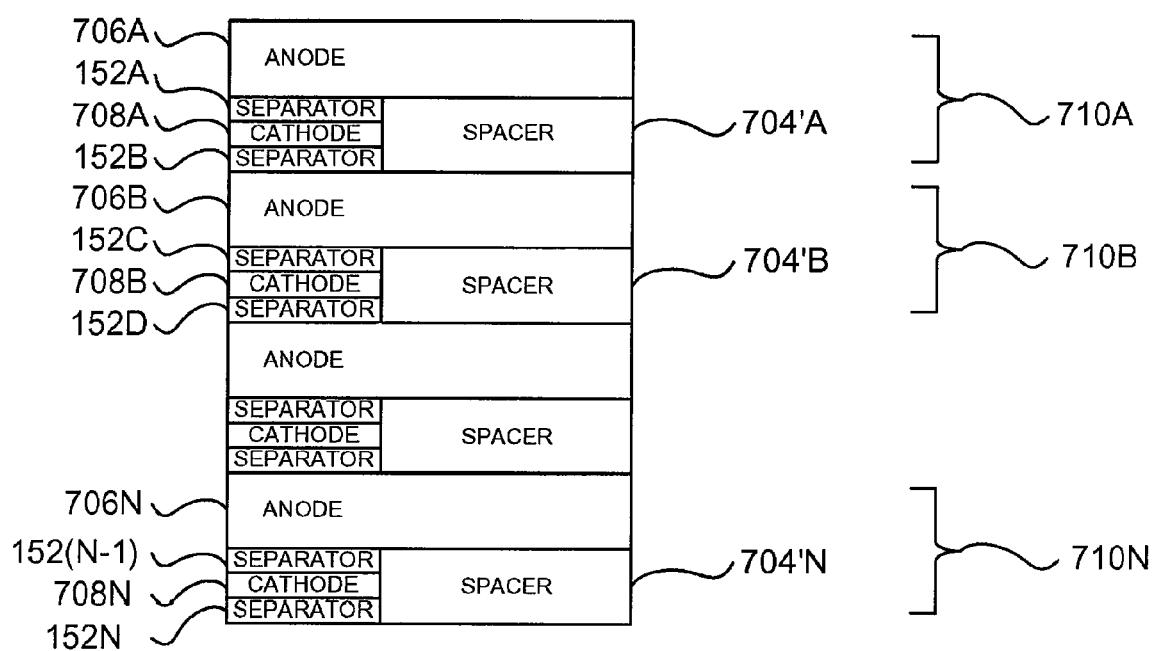
FIG. 7B is a partial front view of the capacitor of FIG. 7A.

FIG. 7B is a partial front view of a capacitor stack, according to one embodiment of the present subject matter. In various embodiments, the illustration includes spacer members 704'A, 704'B, ..., 704'N which are attached to a main spacer body 702. Examples of such spacer include aluminum ribbons connected to anodes 706A, 706B, ..., 706N. A connection of a spacer members 704'A, 704'B, ..., 704'N to anodes 706A, 706B, ..., 706N can include stake welding, or other connection methods.

Additionally, FIG. 7B illustrates elements 710A, ..., 710N. Although the illustrated elements 710A, 710B, ..., 710N include a single anode 706A, 706B, ..., 706N which is of a thickness approximately equivalent to the combined thickness of a stack including two separators 152A, 152B, ..., 152(N–1), 152N and a cathode 708A, 708B, ..., 708N, other embodiments are within the scope of the present subject matter. For example, the anode 706A, 706B, ..., 706N can be comprised of several abutting anode foil subcomponents which are not pictured. In various embodiments, the anode 706A, 706B, ..., 706N can include one foil which includes a connection member, in addition to foils which do not include a connection member. In some of these examples, the anode foils are interconnected through their abutting position in a capacitor element. In various embodiments, anode foils are interconnected using other forms of connection, such as edge welds or solid-state welds such as stake-welds.

In some embodiments, the connection member is not etched, while the non-connection member portions of the anode are. Various embodiments include, but are not limited to, the teachings disclosed on pages 115-119 of related and commonly assigned Provisional U.S. Patent Publication: "Method and Apparatus for Single High Voltage Aluminum Capacitor Design," Ser. No. 60/588,905, filed on Jul. 16, 2004, incorporated herein by reference.

Figure 8:
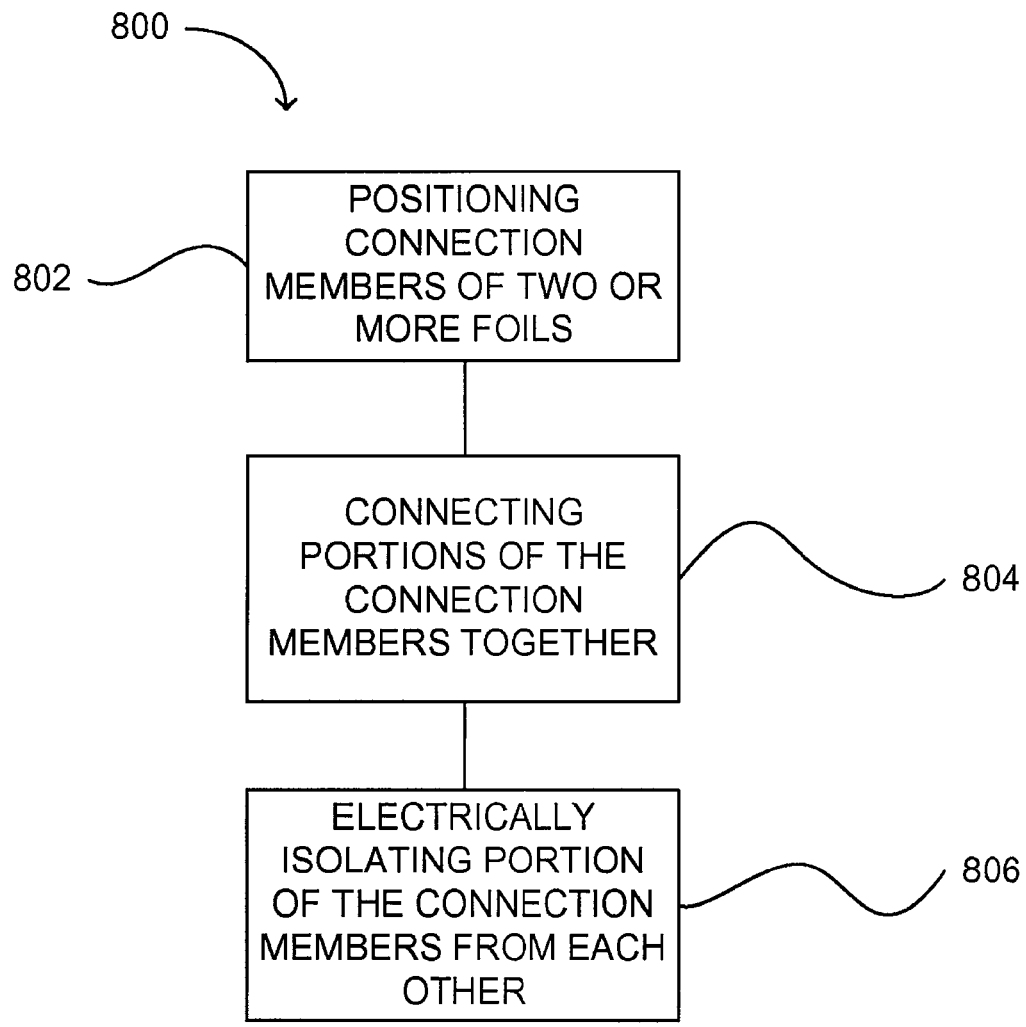
FIG. 8 is a flowchart depicting a method of interconnecting anodes and cathodes of a capacitor according to one embodiment of the present subject matter.

FIG. 8 shows a flowchart depicting a method 800 for interconnecting two or more foils of a capacitor according to one embodiment of the present subject matter. Method 800 includes a block 802, positioning the connection members of two or more foils, a block 804, connecting the connection members, and block 806, electrically isolating portions of the connection members from each other.

In one embodiment, block 802 includes positioning the connection members of two or more foils, includes stacking an anode foil having a connection member having a proximal section and a distal section upon a cathode foil having a connection member having a proximal section and a distal section. The foils and connection members are positioned so that the proximal section of the anode foil connection member does not overlap the proximal section of the cathode foil connection member. In some embodiments, the distal section of the anode foil connection member at least partially overlaps the distal section of the cathode foil connection member.

In one embodiment, block 804 includes connecting the connection members of an anode to the connection members of a cathode. In various embodiments, this includes connecting the distal section of the anode connection member and the distal section of the cathode connection member at a portion of the anode connection member that overlaps the portion of the cathode connection member. In various embodiments, connecting comprises a single, continuous connection process. Various connection processes may be used, including laser welding, staking, edge welding, soldering, swaging, and/or applying an electrically conductive adhesive. Combinations of these processes are possible as well.

In one embodiment, block 806 includes electrically isolating portions of the connection members from each other. In various embodiments, this includes removing portions of the anode connection member and portions of the cathode connection member. In one embodiment, the removed portion includes an area where the cathode connection member overlaps a portion of the anode connection member. In one embodiment, this includes removing a portion of the distal sections of the anode connection member and a portion of the distal section of the cathode connection member. In one embodiment, electrically isolating comprises punching-out a portion of the distal section of the anode foil connection member and the distal section of the cathode connection member. In one embodiment, electrically isolating includes laser cutting a portion of the distal section of the anode connection member and a portion of the distal section of the cathode connection member.

After being processed as discussed in block 806, proximal sections of the connection members of anodes are still coupled to distal sections of the cathodes, and proximal sections of the cathode connection members are still connected to distal portion of the anode, while anodes and cathodes are electrically isolated from each other. Feedthroughs or other terminal members are used to couple the anodes and cathodes to outside circuitry. Although these examples are useful for demonstrating various aspects of the present subject matter, additional examples fall within this scope.

Figure 9:
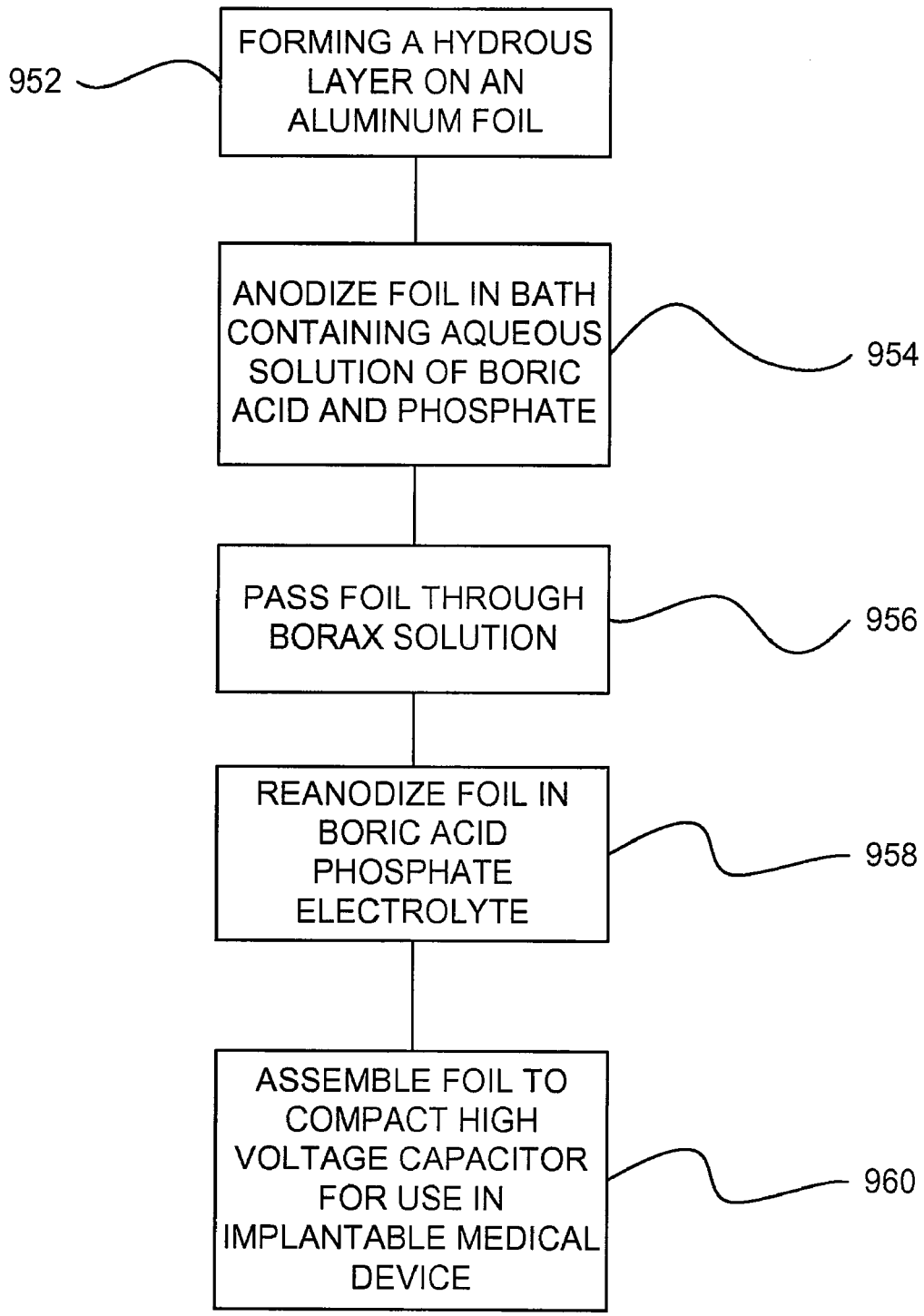
FIG. 9 illustrates an example process for the anodization of an aluminum electrolytic capacitor electrode, according to one embodiment of the present subject matter.

FIG. 9 illustrates an example process for the anodization of aluminum electrolytic capacitor foil, according to the present subject matter. In varying embodiments, the present subject matter is capable of producing anodized aluminum electrolytic capacitor foil at a formation voltage from about 200 volts to about 760 volts, which can result in a capacitor with a working voltage from about 150 volts to about 570 volts. For example, the present subject matter encompasses aluminum oxide formed at between approximately 600 volts and approximately 760 volts. Additionally, the present subject matter encompasses embodiments where anodization occurs from about 653 volts to about 720 volts. Additionally, the present subject matter encompasses embodiments wherein anodization occurs from about 667 volts to about 707 volts during formation.

Varied processes can be utilized to produce the aluminum foil of the present subject matter. For example, one process includes forming a hydrous oxide layer on an aluminum foil by immersing the foil in boiling deionized water 952. The aluminum foil is also subjected to electrochemical anodization in a bath containing an anodizing electrolyte 954 composed of an aqueous solution of boric acid, a phosphate, and a reagent. Additionally, the anodizing electrolyte contains a phosphate. In various embodiments, the anodizing electrolyte is at a pH of approximately 4.0 to approximately 6.0. In some examples, the foil is passed through a bath containing a borax solution 956. Borax, in various embodiments, includes a hydrated sodium borate, $Na_2B_4O_7.10H_2O$, and is an ore of boron.

In varying embodiments, the foil is reanodized in the boric acid-phosphate electrolyte previously discussed 958. In various embodiments of the present subject matter, the process produces a stabilized foil suitable for oxide formation of up to approximately 760 volts.

In various embodiments, the anodizing electrolyte used in block 954 and 956 contains about 10 grams per liter to about 120 grams per liter of boric acid and approximately 2 to approximately 50 parts per million phosphate, preferably as phosphoric acid, and sufficient alkaline reagent to lower the resistivity to within approximately 1500 ohm-cm to approximately 3600 ohm-cm and increase the pH from about 4.0 to about 6.0 for best anodization efficiency and foil quality.

In some embodiments, the borax bath contains 0.001 to 0.05 moles/liter of borax. Because the anodizing electrolyte is acidic, in various embodiments, the borax bath is buffered with sodium carbonate to prevent lowering of the pH by dragout of the acidic electrolyte. Additionally, in various embodiments, the borax bath is buffered to lower its resistivity. In one example, the pH of the bath is from about 8.5 to about 9.5, and the temperature is at least approximately 80 degrees Celsius. In varying embodiments, the sodium concentration is approximately 0.005 to approximately 0.05M, preferably about 0.02 M. It should be noted that concentrations of less than approximately 0.005M are too dilute to control properly, and concentrations above approximately 0.05M increase the pH, resulting in a more reactive solution which degrades barrier layer oxide quality.

In varying embodiments of the present subject matter, the presence of at least approximately 2 parts per million phosphate in the acidic anodizing electrolyte is critical. For example, this presence initiates stabilization of the foil so that solely hydrous oxide dissolves in the alkaline borax bath, without damage to the barrier layer dielectric oxide. In varying embodiments, this lowers ESR (equivalent series resistance) of the anodized foil.

Additionally, in various embodiments, when the foil is reanodized following the alkaline borax bath, the foil surface is alkaline and reacts electrochemically with the phosphate, which, in various embodiments, results in the incorporation of phosphate into the dielectric oxide. In varying examples, the alkaline foil surface includes an alkaline metal aluminate, and in one embodiment includes a sodium aluminate. It should be noted that the amount of allowable phosphate in the anodizing electrolyte, in various embodiments, is inversely proportional to the voltage at which the foil is being anodized. For example, in one embodiment, using greater than approximately 24 parts per million results in failure during oxide formation at around 650 volts. In embodiments where approximately 50 parts per million of phosphate is exceeded, the electrolyte scintillates at the foil interface, resulting in damaged, unstable foil. One benefit of the present subject matter is that an electrode is produced which can tolerate a high formation voltage without scintillation at the boundary layer of the foil. It should be noted that anodization temperature should be maintained from about 85 degrees Celsius to about 95 degrees Celsius, as variance outside of these values results in a the barrier layer oxide of lower quality, and foil corrosion.

Various aspects of the present subject matter include performance properties which enable the capacitor to function as a single capacitor in an implantable medical device 960. In one embodiment, an implantable medical device is a cardioverter defibrillator. For example, by constructing the capacitor stack with the methods and apparatus contained in these teachings, one may construct a capacitor which is suited for use as the sole capacitor used for powering therapeutic pulses in an implantable cardioverter defibrillator. By using a single capacitor, instead of two capacitors which are connected in series, the present subject matter contributes to weight and size reductions.

Although specific embodiments have been illustrated and described herein, it will be appreciated by those of ordinary skill in the art that any arrangement which is calculated to achieve the same purpose may be substituted for the specific embodiment shown. This application is intended to cover adaptations or variations of the present subject matter. It is to be understood that the above description is intended to be illustrative, and not restrictive. Combinations of the above embodiments, and various embodiments, will be apparent to those of skill in the art upon reviewing the above description. The scope of the present subject matter should be determined with reference to the appended claims, along with the full scope of equivalents to which such claims are entitled.

I claim:

1. An apparatus, comprising:
   at least a first element having at least a first element thickness, and including a first separator disposed between a first electrode and a second electrode, the first electrode having a first connection member with a first proximal portion and a first foldable portion, the first foldable portion folded onto and abutting the first proximal portion, the abutting first proximal portion and first foldable portion having a first thickness approximately equal to the first element thickness; and
   at least a second element having a third electrode with a second connection member, the first element and the second element stacked in a capacitor stack,
   wherein the first connection member and the second connection member are in alignment defining a connection surface for connection of the first electrode and the third electrode, with the capacitor stack and electrolyte disposed in a case.

2. The apparatus of claim 1, wherein the first element thickness is from about 0.0065 inches to about 0.015 inches.

3. The capacitor stack of claim 2, wherein the first electrode is an anode with a thickness of between about 0.003 inches and about 0.005 inches.

4. The apparatus of claim 1, wherein the first element includes four layers organized serially in the order of a second separator, a cathode, the first separator, and an anode; and the first separator, cathode, and second separator have a combined thickness approximately equal to the thickness of the anode.

5. The apparatus of claim 1, further comprising: a plurality of layers defining the first element, the first element having the plurality of layers organized serially in the order of a first anode layer including the first connection member, the first separator layer, and a cathode layer having a first cathode connection member; and the second element having a plurality of layers including a second separator and a second anode layer including the second connection member; wherein the connection surface is defined by the first cathode connection member disposed between the first connection member and the second connection member.

6. A method for producing a capacitor stack, comprising: stacking a first electrode onto a first element, the first electrode having a first connection member having a first proximal portion and a first foldable portion; folding the first foldable portion onto the first proximal portion such that the first foldable portion and the first proximal portion have a first thickness approximately equal to a thickness of the first element; stacking the first element onto a second element having at least one second electrode and a second connection member; aligning the first connection member and the second connection member to define a connection surface for connection of the first electrode and the at least one second electrode; connecting the first electrode and the at least one second electrode at the connection surface; disposing the stacked first element and second element in a case; and filling the case with an electrolyte.

7. The method of claim 6, further comprising:
applying a mask to the first electrode and defining a masked area, the masked area including at least the first connection member;
etching the electrode, the mask resisting the etchant; and removing the mask.

8. The method of claim 7, further comprising applying the mask to two sides of the first electrode.

9. The method of claim 7, further comprising cutting the first electrode from a sheet.

10. An apparatus for patient therapy, comprising:
a flat capacitor stack having at least a first separator disposed in alignment between a first substantially planar electrode and a second substantially planar electrode, the first substantially planar electrode having a first connection member with a first proximal portion and a first foldable portion, the first foldable portion folded onto and abutting the first proximal portion, the abutting first proximal portion and first foldable portion having a first thickness approximately equal to the first element thickness; and a third substantially planar electrode in stacked alignment with the second substantially planar electrode, the third substantially planar electrode having a second connection member, with the first connection member and the second connection member are in alignment defining a connection surface for connection of the first substantially planar electrode and the third substantially planar electrode;
a case having at least one feedthrough, the capacitor stack sealably disposed in the case;
programmable electronics connected to the capacitor; and
a housing adapted for implantation in the patient, the case and programmable electronics disposed in the housing, wherein the flat capacitor stack and the case are adapted to deliver to the patient from about 5.3 joules per cubic centimeter of capacitor stack volume to about 6.3 joules per cubic centimeter of capacitor stack volume.

11. The apparatus of claim 10, further comprising four layers organized serially in the order of a second separator, a cathode, the first separator, and an anode having the first connection member; with the first separator, cathode, and second separator have a combined thickness approximately equal to the thickness of the anode.

12. The apparatus of claim 10, further comprising: a first element having a plurality of layers organized serially in the order of a first anode layer including the first connection member, the first separator layer, and a cathode layer having a first cathode connection member; and a second element having a plurality of layers including a second separator and a second anode layer including the second connection member; wherein the connection surface is defined by the cathode connection member disposed between the first connection member and the second connection member.

13. An electrode stack, comprising:
a first element having at least a first substantially planar electrode and a second substantially planar electrode in stacked alignment;
a second element in stacked alignment with the first element, the second element having at least a third substantially planar electrode and a fourth substantially planar electrode in stacked alignment;
a first connection member of the first element, the first connection member including a first proximal portion and a first foldable portion, the first foldable portion folded onto and abutting the first proximal portion, the abutting first proximal portion and first foldable portion having a first thickness approximately equal to a thickness of the first element; and
a second connection means for interconnecting the second substantially planar electrode and the forth substantially planar electrode,
wherein the first substantially planar electrode and the third substantially electrode are interconnected, and the second substantially planar electrode and the fourth substantially planar electrode are interconnected, and the electrode stack is adapted to deliver from about 7.0 Joules/cubic centimeter of electrode stack volume, to about 8.5 Joules/cubic centimeter of electrode stack volume.

14. The apparatus of claim 13, wherein the first connection member includes a brittle etched portion and an unetched means for bending.

15. The apparatus of claim 13, wherein the first connection means includes unetched means for welded interconnection of the first substantially planar electrode and the third substantially planar electrode.

* * * * *

UNITED STATES PATENT AND TRADEMARK OFFICE
CERTIFICATE OF CORRECTION

| | |
|---|---|
| PATENT NO. | : 7,564,677 B2 |
| APPLICATION NO. | : 11/112094 |
| DATED | : July 21, 2009 |
| INVENTOR(S) | : James M. Poplett |

It is certified that error appears in the above-identified patent and that said Letters Patent is hereby corrected as shown below:

In column 18, line 53, in Claim 15, delete "means" and insert -- member --, therefor.

Signed and Sealed this

Third Day of November, 2009

David J. Kappos
*Director of the United States Patent and Trademark Office*